US007587423B2

(12) United States Patent
Kalthoff et al.

(10) Patent No.: US 7,587,423 B2
(45) Date of Patent: Sep. 8, 2009

(54) MULTISTEP MASTER DATA CLEANSING IN OPERATIVE BUSINESS PROCESSES

(75) Inventors: Wolfgang Kalthoff, Bad Schoenborn (DE); Oliver Kuestner, Schwetzingen (DE); Joerg Wiederspohn, Heidelberg (DE)

(73) Assignee: SAP AG, Walldorf (DE)

( * ) Notice: Subject to any disclaimer, the term of this patent is extended or adjusted under 35 U.S.C. 154(b) by 1129 days.

(21) Appl. No.: 10/943,138

(22) Filed: Sep. 17, 2004

(65) Prior Publication Data

US 2006/0064456 A1    Mar. 23, 2006

(51) Int. Cl.
*G06F 17/00*    (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS 6,157,944 A    12/2000    Pedersen

2004/0006578 A1    1/2004    Yu et al.

FOREIGN PATENT DOCUMENTS

EP    0 809 184    11/1997

*Primary Examiner*—Isaac M Woo
(74) *Attorney, Agent, or Firm*—Schwegman, Lundberg & Woessner, P.A.

(57) ABSTRACT

Proliferation of duplicative master data in a master data server is prevented. Data is received from a first client computer system at a master data server that includes a data store for master data used by the first client computer system and a second client computer system. Preliminary tests are run to determine whether the data received from the first client computer system are duplicative of master data in the data store. The received data are in the data store as master data and distributed to the second client computer system if the preliminary tests do not determine that the received data are duplicative of master data in the data store. Additional tests are run after distribution of the received data to the second client computer system to determine whether the data received from the first client computer system are duplicative of master data in the data store.

29 Claims, 8 Drawing Sheets

MULTISTEP MASTER DATA CLEANSING IN OPERATIVE BUSINESS PROCESSES

TECHNICAL FIELD

This document relates to reducing duplicative master data that are distributed by a central master data server.

BACKGROUND

Information technology ("IT") environments may consist of many different computer systems performing processes, such as business processes, on master data. The different computer systems may be part of the same entity or may be part of different entities, such as vendors or contractors. The master data used by the processes may be centrally stored on a master data server that distributes master data needed by each process to the computer system performing the process. In addition, master data that have been created or modified on the different computer systems is transferred to the master data server for later storage and distribution.

Multiple processes may operate on a common set of master data. As such, the multiple processes each may create the same master data and may modify local copies of the same master data. The commonly created or modified master data may be transferred to and stored on the master data server. Furthermore, the multiple processes may require that the common master data be quickly transferred to the master data server and distributed by the master data server before duplicative master data may be identified or cleansed. Therefore, the master data server and the different computer systems may include duplicative master data that are redundant, incorrect, obsolete, or irrelevant, which may result in high costs for maintaining unnecessary master data. In addition, business analysis performed using duplicative master data may result in incorrect or inaccurate conclusions, which may lead to poor business decisions.

SUMMARY

In one general aspect, proliferation of duplicative master data in a master data server is prevented. Data is received from a first client computer system at a master data server. The master data server includes a data store for master data used by the first client computer system and a second client computer system. Preliminary tests are run to determine whether the data received from the first client computer system are duplicative of a portion of the master data stored in the data store. The received data are stored in the data store as master data and distributed to the second client computer system if the preliminary tests do not determine that the received data are duplicative of a portion of the master data stored in the data store. Additional tests are run after distribution of the received data to the second client computer system to determine whether the data received from the first client computer system are duplicative of a portion of the master data stored in the data store.

Implementations may include one or more of the following features. For example, the portion of the master data stored in the data store that is duplicative of the received data may be cleansed when the preliminary tests or the additional tests determine that the received data are duplicative of a portion of the master data stored in the data store. Cleansing the portion of the master data stored in the data store that is duplicative of the received data may include deleting the portion of the master data stored in the data store that is duplicative of the received data, and storing the received data in the data store as master data.

Cleansing the portion of the master data stored in the data store that is duplicative of the received data also may include discarding the received data. Cleansing the portion of the master data stored in the data store that is duplicative of the received data may include setting attributes of the received data and the duplicative portion of the stored master data to a common value when the attributes do not have literally matching values between the received data and the duplicative portion of the stored master data. Cleansing the portion of the master data stored in the data store that is duplicative of the received data may include storing the received data in the data store as master data and causing the received data to refer to the duplicative portion.

Data received from the first client computer system may be created or modified by the first client computer system. Prior to receiving data from the first client computer system, master data may be stored on the first client computer system and preliminary tests may be run to determine whether the created or modified data is duplicative of a portion of the master data stored on the first client computer system. Only the created portion or modified portion of the data that is not duplicative of the portion of the master data that is stored on the first client computer system may be transmitted to the master data server.

Data distributed to the second client computer system may be stored and used by the second client computer system. After distributing the received data to the second client computer system, the received data may be stored as master data on the second client computer system and additional tests may be run to determine whether the received data is duplicative of a portion of the master data stored on the second client computer system. Only the portion of the received data that is not duplicative of the portion of the master data that is stored on the second client computer system may be used.

Running preliminary tests to determine whether the data received from the first client computer system are duplicative of a portion of the master data stored in the data store may include running the preliminary tests to definitively determine whether the received data are duplicative of a portion of the stored master data within a maximum allowable amount of time. Storing the received data in the data store may include storing the received data in the data store when the preliminary tests do not definitively determine that the received data are duplicative of a portion of the stored master data within the maximum allowable amount of time. Distributing the received data to the second client computer system may include distributing the received data to the second client computer system when the preliminary tests do not definitively determine that the received data are duplicative of a portion of the stored master data within the maximum allowable amount of time.

The portion of the stored master data that are duplicative of the received data may be cleansed when the preliminary tests definitively determine that the received data are duplicative of a portion of the stored master data within the maximum allowable amount of time.

When the preliminary tests do not definitively determine that the received data are duplicative of a portion of the stored master data within the maximum allowable amount of time, it may be indicated that a later determination of whether the received data are duplicative of a portion of the master data stored in the data store is necessary.

A user may be enabled to manually indicate whether the received data are duplicative of a portion of the stored master data when an indication that a later determination of whether the received data are duplicative of a portion of the stored master data is necessary is received.

Enabling a user to manually indicate whether the received data are duplicative of a portion of the stored master data may include enabling a user to identify a portion of the master data stored in the data store that is duplicative of the received data. The portion of the master data in the data store that is duplicative of the received data may be cleansed.

Running the additional tests may include accessing an external service to verify a determination of whether the data received from the first client computer system is duplicative of a portion of the master data stored in the data store. The external service may be a web-based service.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

Master data used by multiple client computer systems are distributed to the multiple client computer systems by a master data server. Each of the multiple client computer systems transfer master data that have been created or modified locally on the client computer system to the master data server such that the master data server may distribute the created or modified master data to the other client computer systems. To reduce the amount of duplicative master data that are available to the multiple client computer systems, the master data server tests for duplicative master data both before and after the master data are distributed to the multiple client computer systems. If very fast distribution is required, the master data server may perform quick tests for duplicates before the master data are distributed, and more in-depth, time-intensive tests after the master data have been distributed. In addition, each of the multiple client computer systems may test for duplicates either before the master data are transferred to the master data server or after the master data have been received from the master data server. Master data for which duplicates are or are not found with complete certainty may be stored for later asynchronous testing for duplicates and be treated initially as if no duplicates have been found.

The ability to reduce the proliferation of duplicative master data may be useful to a business entity that operates the master data server and the multiple client computer systems. For example, for a business enterprise that operates a large number of computer systems across which a large amount of master data is replicated and maintained, reducing the amount of duplicative master data that is available reduces the overhead and error costs of maintaining duplicative master data. Furthermore, analytical processes produce fewer erroneous or suboptimal results that are based on duplicative master data when the duplicative master data are reduced. Testing for and reducing duplicative master data multiple times need not interrupt the business processes of the business enterprise. When the business processes do not allow for the testing and elimination of duplicative master data in real time, the testing and elimination can be deferred until a later time at which the testing and elimination may be performed, so the business processes are not interrupted.

Figure 1:
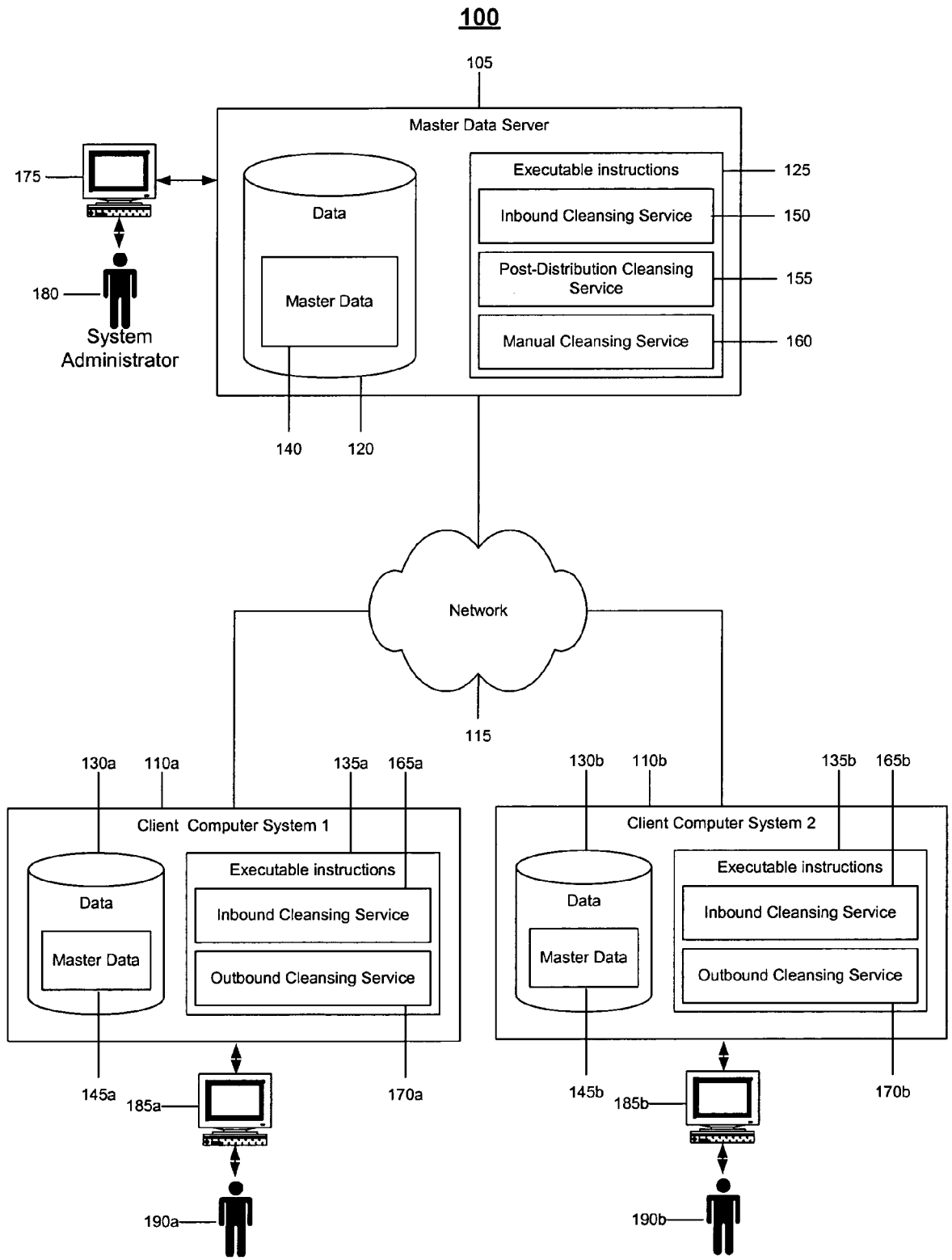
FIG. 1 is a block diagram of a system for centrally storing master data on a master data server that communicates with multiple client computer systems.

FIG. 1 shows a block diagram of a system 100 of networked computers, including a master data server 105 and client computer systems 110a and 110b, that communicate over a network 115. The master data server 105 manages master data for the client computer systems 110a and 110b. More particularly, the master data server 105 provides master data for use on the client computer systems 110a and 110b, and the client computer systems 110a and 110b create or modify master data for storage on and distribution by the master data server 105. The master data server 105 and the client computer systems 110a and 110b may test for and cleanse duplicative master data to reduce the amount of duplicative master data that are passed between the master data server 105 and the client computer systems 110a and 110b.

The master data server 105 includes a data storage device 120 and executable instructions 125. Similarly, the client computer system 110a includes a data storage device 130a and executable instructions 135a, and the client computer system 110b includes a data storage device 130b and executable instructions 135b. Particular portions of data, here referred to as master data 140, 145a, and 145b, are stored in the data storage devices 120, 130a, and 130b, respectively. Applications and processes operating on the master data server 105 access and use the master data 140, applications and processes operating on the client computer system 110a access and use the master data 145a, and applications and processes operating on the client computer system 110b access and use the master data 145b. Because the master data server 105 distributes the master data 140 to the client computer systems 110a and 110b, the master data 145a and 145b each include a portion of the master data 140.

The master data 140, 145a, and 145b each include multiple master data objects. Master data objects refer to data that are created, revised or deleted by applications or processes running on the master data server 105 and the client computer systems 110a and 110b. Often, a master data object refers to a principal entity used in the applications or processes. Examples of master data objects include, but are not limited to, a sales order object, a product object, an employee object, a customer object, or a business partner object. Each master data object in the master data 140, 145a, and 145b is a collection of data attribute values. A master data object may be stored as a row in a relational database table, an object instance in an object-oriented database, data in an extensible mark-up language (XML) file, or a record in a data file.

The executable instructions 125 include an inbound cleansing service 150, a post-distribution cleansing service 155, and a manual cleansing service 160. The inbound cleansing service 150 tests for duplicative master data after master data have been received from one of the client computer systems 110*a* and 110*b* and before the received master data are distributed to the client computer systems 110*a* and 110*b*. More particularly, the inbound cleansing service 150 checks for duplicates of the master data received from one of the client computer systems 110*a* and 110*b* in the master data 140. If duplicates are found with complete certainty, then the inbound cleansing service 150 cleanses the duplicates and prevents the duplicates from being distributed to the client computer systems 110*a* and 110*b*. If duplicates are not found with complete certainty, then the received master data are marked for later testing, stored in the master data 140, and distributed to the client computer systems 110*a* and 110*b*. Otherwise, the received master data are only stored in the master data 140 and distributed to the client computer systems 110*a* and 110*b*.

The post-distribution cleansing service 155 tests for duplicative master data after master data that have been received from one of the client computer systems 110*a* and 110*b* are distributed to the client computer systems 110*a* and 110*b*. Like the inbound cleansing service 150, the post-distribution cleansing service 155 checks for duplicates of the received master data in the master data 140. If duplicates are found with complete certainty, the post-distribution cleansing service 155 cleanses the duplicates and may notify the client computer systems to which the received master data were distributed of the duplicates. If duplicates are not found with complete certainty, then the received master data are marked for later testing. Otherwise, the received master data remain unchanged in the master data 140 and are normally used from the master data 140.

The manual cleansing service 160 enables a user or a system administrator of the master data server 105 to manually indicate whether duplicates of master data received from one of the client computer systems 110*a* and 110*b* appear in the master data 140. The manual cleansing service 160 tests for duplicates of master data for which previous tests have not found duplicates in the master data 140 with complete certainty. In other words, the manual cleansing service 160 is used to test the received master data that are marked for later cleansing. If the user or the system administrator identifies duplicates of the marked master data in the master data 140, the manual cleansing service 160 cleanses the duplicates and may notify the client computer systems to which the marked master data were distributed of the duplicates. Otherwise, the received master data remain unchanged in the master data 140 and are normally used from the master data 140.

In general, the post-distribution cleansing service 155 and the manual cleansing service 160 test for duplicative master data outside of the business process in which master data received from one client computer system is rapidly distributed to other client computer systems by the master data server 105. This asynchronous testing prevents the business process from being interrupted by time-intensive duplicate testing by deferring the time-intensive testing to a more suitable time. The inbound cleansing process 150 performs whatever tests for duplicates may be performed before the master data are distributed to the client computer systems 110*a* and 110*b*, and the post-distribution cleansing service 155 and the manual cleansing service 160 perform any additional tests necessary to identify and eliminate duplicative master data. This may be accomplished, for example, through use of a task scheduler (not shown) that initiates the post-distribution cleansing service 155 and the manual cleansing service 160 at a particular day and time. The post-distribution cleansing service 155 and the manual cleansing service 160 may be scheduled as recurring events based on the occurrence of a predetermined time or date (such as each night or every Saturday at 3:00 A.M.). In addition, the post-distribution cleansing service 155 and the manual cleansing service 160 may be performed each time master data are marked for later testing or after a predetermined amount of master data have been marked for later testing.

The executable instructions 135*a* and 135*b* include, respectively, inbound cleansing services 165*a* and 165*b* and outbound cleansing services 170*a* and 170*b*. The inbound cleansing services 165*a* and 165*b* and the outbound cleansing services 170*a* and 170*b* are similar in function but differ in time of performance. More particularly, the inbound cleansing services 165*a* and 165*b* tests for duplicative master data when the client computer systems 110*a* and 110*b*, respectively, receive master data from the master data server 105, and the outbound cleansing services 170*a* and 170*b* tests for duplicative master data before master data that have been created on the client computer systems 110*a* and 110*b*, respectively, are transferred to the master data server 105. The inbound cleansing service 165*a* and the outbound cleansing service 170*a* checks for duplicates of the received master data in the master data 145*a*, while the inbound cleansing service 165*b* and the outbound cleansing service 170*b* do so in the master data 145*b*. If duplicates are found with complete certainty, the cleansing services 165*a*, 165*b*, 170*a*, and 170*b* cleanse the duplicates and prevent the duplicates from being stored, used, or transferred to the master data server 105. Otherwise, the master data are normally stored, used, and transferred to the master data server 105.

The cleansing services 150, 155, 160, 165*a*, 165*b*, 170*a*, and 170*b* all test for duplicates of the same master data at various points in the life cycle of the master data, so all of the cleansing services 150, 155, 160, 165*a*, 165*b*, 170*a*, and 170*b* may not be necessary to test for duplicative master data. Instead, some implementations of the system 100 may include only a subset of the cleansing services 150, 155, 160, 165*a*, 165*b*, 170*a*, and 170*b*. For example, one implementation may include only the cleansing services 150 and 155 such that duplicative master data on the client computer systems 110*a* and 110*b* are never identified or cleansed. In such an implementation, the combination of the cleansing services 150 and 155 fully identifies and cleanses duplicative master data both before and after the master data are distributed to the client computer systems 110*a* and 110*b*.

The system 100 includes a client computer 175 used by a system administrator 180 to administer the master data server 105. For example, the system administrator 180 may use the client computer 175 to interact with the manual cleansing service 160 to manually identify duplicative master data. The system 100 also includes client computers 185*a* and 185*b* used by users 190*a* and 190*b* to access the client computer systems 110*a* and 110*b*, respectively. For example, the user 190*a* may use the client computer 185*a* to create or modify master data stored in the data storage device 130*a*. The master data server 105, the client computer systems 110*a* and 110*b*, and the client computers 175, 185*a*, and 185*b* all are capable of executing instructions on data.

The master data server 105, the client computer systems 110*a* and 110*b*, and the client computers 175, 185*a*, and 185*b* may be arranged to operate within or in concert with one or more other systems, such as the network 115, which may represent, for example, one or more local area networks (LANs) and/or one or more wide area networks (WANs). The client computer 175 may be a general-purpose computer that is capable of operating as a client of the master data server 105 (e.g., a desktop personal computer, a workstation, or a laptop computer running an application program). Similarly, the client computers 185a and 185b may be general-purpose computers that are capable of operating as clients of the client computer systems 110a and 110b, respectively. Alternatively, the client computers 175, 185a, and 185b may be more special purpose computers (e.g., a device specifically programmed to operate as a client of the master data server 105 or the client computer systems 110a and 110b). The master data server 105, the client computer systems 110a and 110b, and the client computers 175, 185a, and 185b may be capable of communicating through wired or wireless communications pathways.

Figure 2:
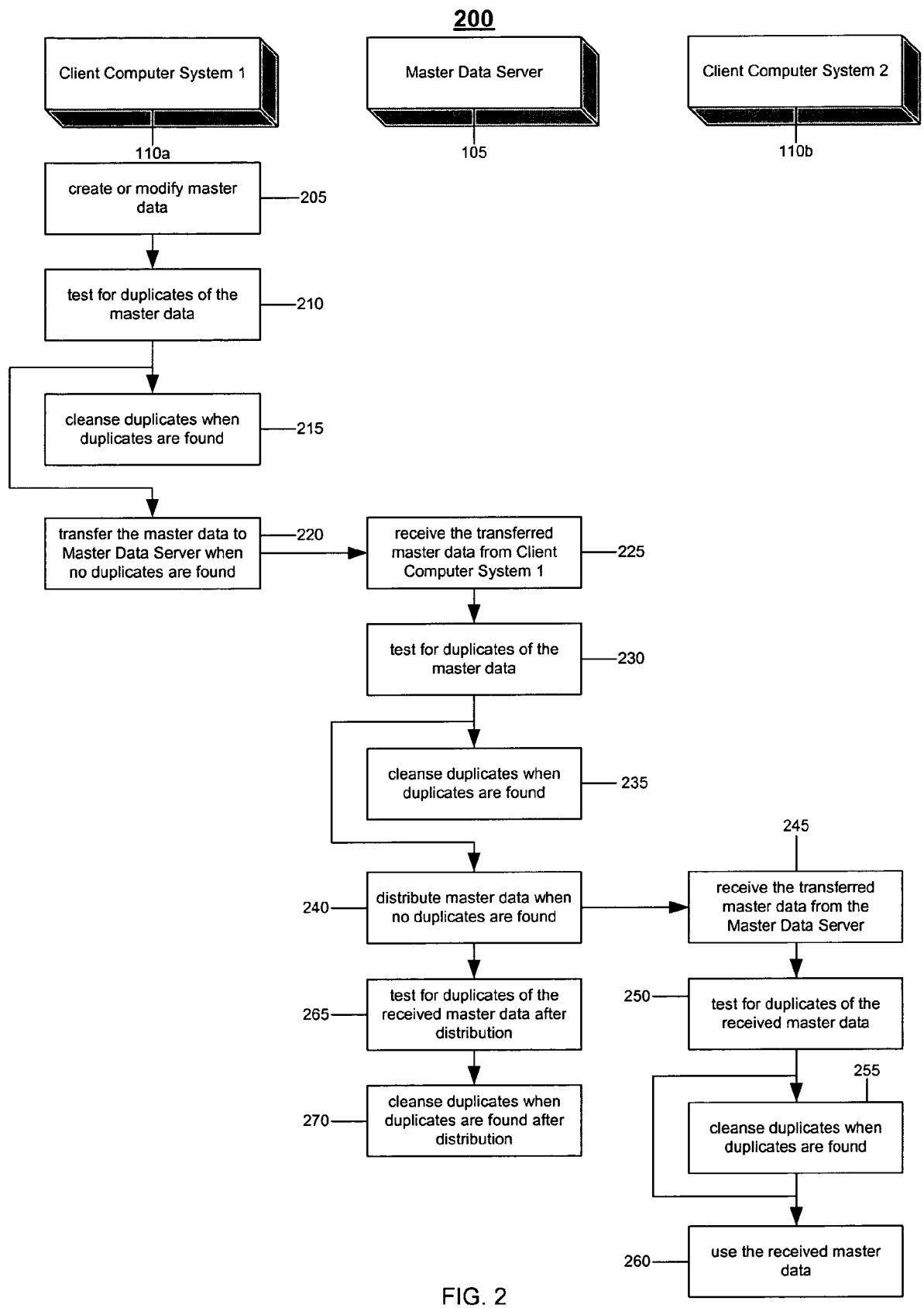
FIG. 2 is a communications diagram of a process for reducing duplicative master data on multiple systems that use the duplicative master data.

Referring to FIG. 2, a process 200 is used to check for duplicative master data multiple times at multiple locations where master data are stored. The process involves a master data server 105, such as, for example, the master data server 105 of FIG. 1, and client computer systems 110a and 110b, such as, for example, the client computer systems 110a and 110b of FIG. 1. Each of the master data server 105 and the client computer systems 110a and 110b check for duplicative master data to reduce the amount of duplicative master data that are available from the multiple stores of master data.

The process 200 begins when the client computer system 110a creates or modifies master data (step 205). The client computer system 110a may create master data from data that are entered into the client computer system 110a by a user of the client computer system 110a, such as the user 190a of FIG. 1. Alternatively or additionally, the master data may be created by processes running on the client computer system 110a. The user or the processes operating on the client computer system 110a also may modify master data that have been sent to the client computer system 110a by the master data server 105.

The client computer system 110a then tests for duplicates of the master data that were created or modified locally (step 210). The duplicates may be identified in a local store of master data, such as the master data 145a of FIG. 1, or in a store of master data on the master data server 105, such as the master data 140 of FIG. 1. Testing for duplicates may include executing the outbound cleansing service 170a of FIG. 1. In testing for duplicates, the client computer system 110a may identify locally stored master data that match the created or modified master data. Alternatively or additionally, the client computer system 110a may identify stored master data that are similar enough to the created or modified master data to be called duplicative. Stored master data may be called similar enough to the created or modified master data if attributes of the stored master data and the created or modified master data nearly match. In other words, attributes of the two master data objects may include literally different information, but further calculation and consideration may indicate that the literally different information is actually duplicative, which may indicate that the two master data objects are duplicative.

For example, a first master data object including address information for a particular customer may be stored, and a second master data object including the address information for the particular customer may be created or modified by the client computer system 110a. Street address, city, and state attributes of the first and second master data objects may match exactly, but a zip code attribute of the first and second master data objects may differ by a single digit. The difference between the values of the two zip code attributes may result from a typographical error while creating or modifying the second master data object. Therefore, the first and second master data objects may be called duplicative of one another, even though the information included in the first and second master data does not match literally. A determination of a correct zip code for the address corresponding to the matching street address, city, and state attributes may be made to more certainly decide whether the first and second master data objects are duplicative. The zip code attribute of the first master data object may match the correct zip code, and the zip code attribute for the second master data object may differ from the correct zip code by a single digit, which may indicate that the difference is minor and may be the result of a typographical error. Therefore, the first and second master data objects may be called duplicative more definitively.

If any duplicates are found, then the client computer system 110a cleanses the duplicates (step 215). Cleansing the duplicates when duplicates are found may include storing the created or modified master data as an additional duplicate or discarding the created or modified master data and then cleansing the identified duplicates. In one implementation, cleansing the duplicates in the local master data store may include deleting all but one of the duplicates. In another implementation, cleansing the duplicates may include ensuring that all of the duplicates include the same information. For example, an attribute of the duplicates may have different values across the duplicates. Attributes that have different values across the duplicates may be set to a common value to create literal consistency across the duplicates. In yet another implementation, cleansing the duplicates may include causing the duplicates to refer to one of the duplicates such that only one of the duplicates needs to be maintained. Cleansing the duplicates also may include a combination of the above implementations. For example, the created or modified master data may be stored as an additional duplicate in the local master data store, the duplicates may be made to include the same information, and then all but one of the duplicates may be deleted from the local master data store.

If no duplicates are found, then the master data are transferred to the master data server 105 (step 220), and the master data server 105 receives the master data (step 225). Having received the master data, the master data server 105 may transfer the master data to other client computer systems that may use the master data, such as the client computer system 110b. Prior to doing so, the master data server 105 tests for duplicates of the received master data in a local store of master data, such as the master data 140 of FIG. 1 (step 230). Testing for duplicates may include executing the inbound cleansing service 150 of FIG. 1. In testing for duplicates, the master data server 105 may identify locally stored master data that match, or is sufficiently similar to, the received master data.

If any duplicates are found, then the master data server 105 cleanses the duplicates within the local master data store (step 235). The duplicates may be cleansed on the master data server 105 similarly to how duplicates are cleansed by the client computer system 110a. If no duplicates are found, then the master data are distributed to the other client computer systems that may use the received master data, such as the client computer system 110b (step 240), and the client computer system 110b receives the master data (step 245). Having received the master data, the client computer system 110b may use the maser data. Prior to doing so, the client computer system 110b tests for duplicates of the received master data in a local store of master data, such as the master data 145b of FIG. 1, or in a store of master data on the master data server 105, such as the master data server 140 of FIG. 1 (step 250). Testing for duplicates may include executing the inbound cleansing service 165b of FIG. 1. In testing for duplicates, the client computer system 110b may identify stored master data that match, or is sufficiently similar to, the received master data.

If any duplicates are found, then the client computer system 110b cleanses the duplicates (step 255). The duplicates may be cleansed on the client computer system 110b similarly to how duplicates are cleansed by the client computer system 110a and by the master data server 105. If no duplicates are found, then the client computer system 110b simply uses the received master data (step 260). As the received master data are used, the received master data may be modified, and the modified master data may be passed back to the client computer system 110b through the master data server 105 in a manner similar to what is described above.

The master data server 105 also may test for duplicates of the received master data in the local master data store after the master data have been distributed to the other client computer systems (step 265). Testing for duplicates may include executing the post-distribution cleansing service 155 or the manual cleansing service 160 of FIG. 1. The master data server 105 may do so when rapid distribution of the master data is necessary such that the master data server 105 does not have sufficient time to fully test for duplicates in the local master data store before the master data are distributed. In such as case, the master data server 105 may not test for duplicates before the received master data are distributed and may defer testing for duplicates until after the master data are distributed. Alternatively, the master data server may run less time-intensive tests before the master data are distributed and more in-depth, time-intensive tests after the master data are distributed. The less time-intensive tests may affect how the received master data are distributed, while the more time-intensive tests may be used to prevent the received master data from being distributed further when the received master data are duplicative.

The less time-intensive tests may include simple comparisons of attributes of the master data, such as a name, address, or social security number associated with the master data. The more time-intensive tests may include tests for which a relatively large amount of processing is necessary to identify duplicates. For example, complex calculations using the received master data may be necessary to identify duplicates of the received master data. As another example, the more time-intensive tests may include accessing an external system from which additional information relevant to identifying duplicates of the received master data may be retrieved, and using the retrieved information to verify the identification of the duplicates. The additional information may include information describing a customer, product, or other entity related to the received master data that may be helpful in identifying the duplicates. Distribution of the received master data may be required before the calculations may be completed, so the calculations may be deferred until after the master data server 105 distributes the received master data.

If any duplicates are found, then the client computer system 110b cleanses the duplicates within the local master data store (step 270). The duplicates may be cleansed on the client computer system 110b similarly to how duplicates are cleansed by the client computer systems 110a and 110b, and earlier by the master data server 105. If no duplicates are found, the master data server 105 does not take any further action.

Figure 3:
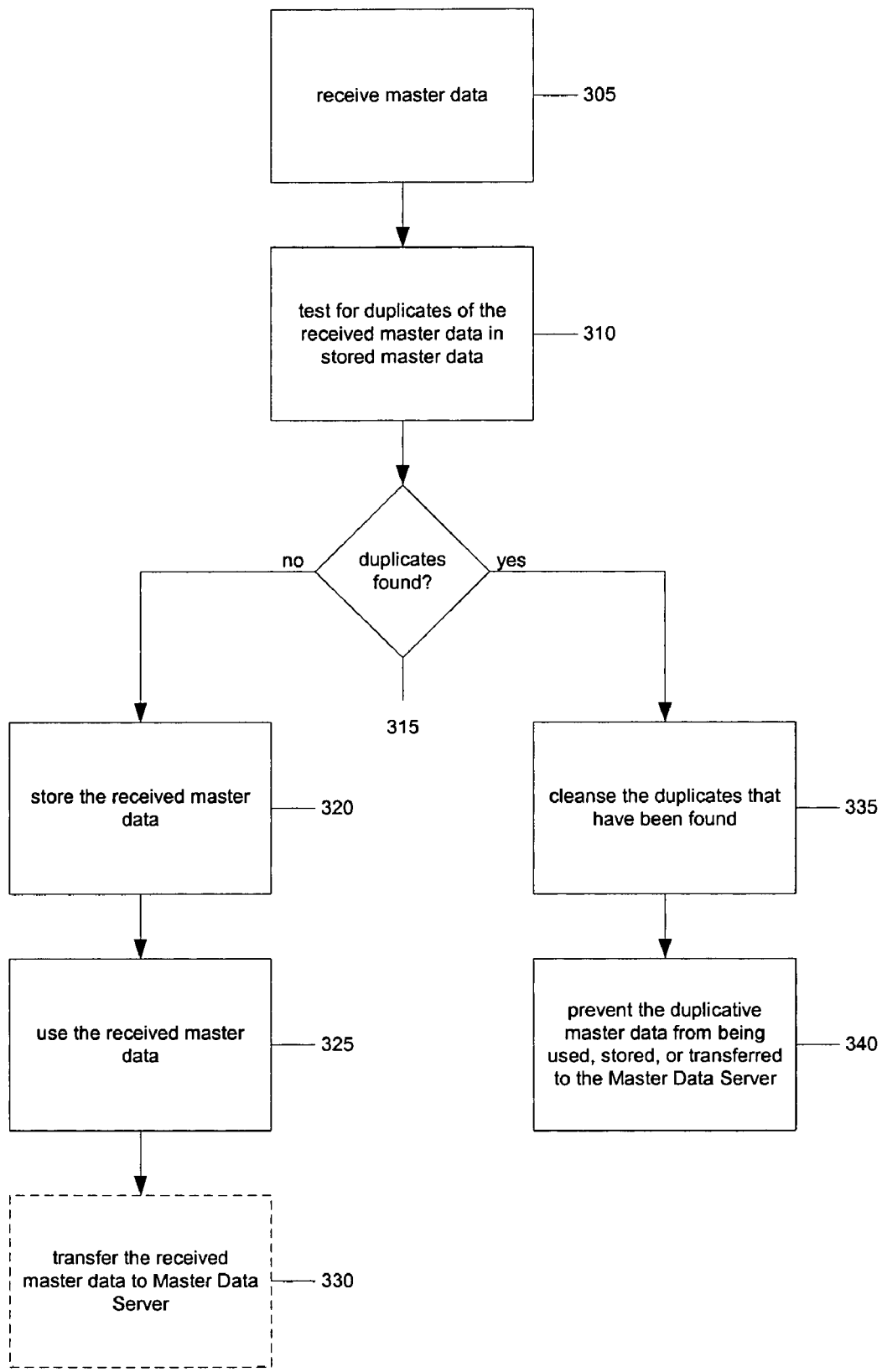
FIG. 3 is a flow chart of a process for reducing duplicative master data from a client computer system that uses master data.

FIG. 3 is a flow chart of a process 300 for testing for and cleansing duplicative master data on a client computer system that uses master data. The process 300 may be one implementation of the cleansing services 165a, 165b, 170a, or 170b of FIG. 1. The process 300 is executed by a client computer system, such as one of the client computer systems 110a or 110b of FIG. 1, that shares master data with a master data server, such as the master data server 105 of FIG. 1. The process 300 is executed either after master data have been created or modified on the client computer system and before the created or modified master data have been transferred to the master data server, or after master data have been received from the master data server.

The process 300 begins when master data are received (step 305). The master data that are received may be master data that are created or modified by applications or processes that are running on the client computer system executing the process 300. Such master data may be recieved before or after the master data is transferred from the client computer system to the master data server. Alternatively or additionally, the master data that are received may be master data that have been distributed to the client computer system from the master data server.

The client computer system tests for duplicates of the received master data in stored master data (step 310). The stored master data may be a local store of master data, such as one of the master data 145a and 145b of FIG. 1, or a store of master data on the master data server, such as the master data 140 of FIG. 1. Testing for duplicates may result in the identification of stored master data that match the received master data or that are similar enough to the received master data to be called duplicative.

A determination is made as to whether any duplicates of the received master data have been found (step 315). If no duplicates are found, then the received master data are stored (step 320). The received master data may be stored in the local store of master data or in the store of master data on the master data server. In addition, the master data may be used, for example, by applications or processes running on the client computer system or on the master data server (step 325). Some or all of the received master data also may be transferred to the master data server, for example, when some or all of the received master data previously have not been transferred to or stored on the master data server (step 330). For example, in one implementation, only the received master data that are orginally created on the client computer system may be transferred to the master data server. In other words, the received master data are treated normally when duplicates of the received master data are not found.

However, if duplicates are found, then the duplicates that have been found are cleansed (step 335). The duplicates are cleansed in a manner similar to what is described with respect to step 215 of FIG. 2. In addition, the client computer system prevents the received master data from being used, stored locally or on the master data server, and transferred to the master data server for distribution to other client computer systems (step 340). Therefore, the duplicates have been cleansed before being proliferated to the other client computer systems.

Figure 4:
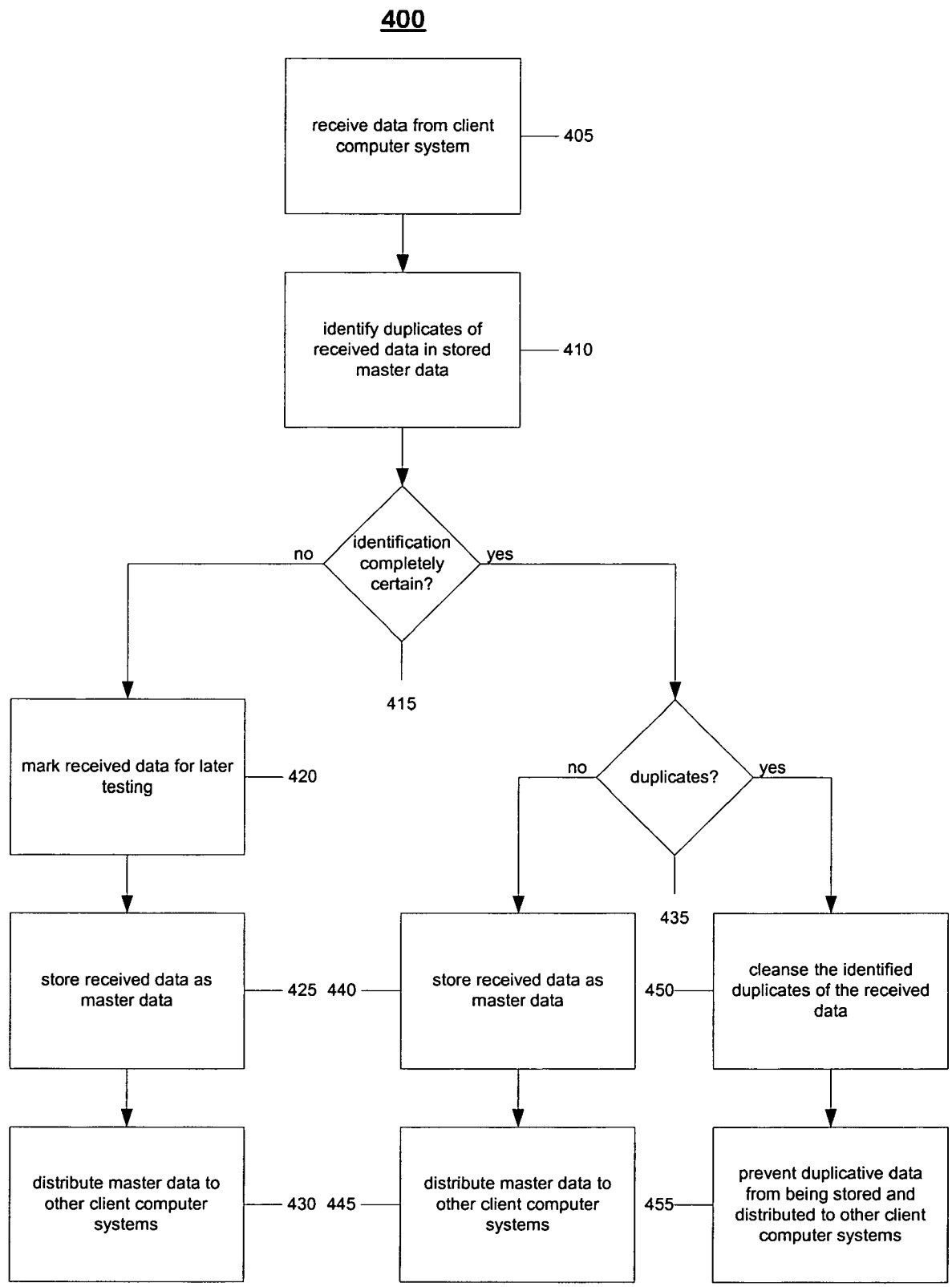
FIG. 4 is a flow chart of a process for reducing duplicative master data from a master data server before the duplicative master data are distributed.

FIG. 4 is a flow chart of a process 400 for testing for and cleansing duplicative master data on a master data server that provides master data to multiple client computer systems that use the master data. The process 400 may be one implementation of the inbound cleansing process 150 of FIG. 1. The process 400 is executed by a master data server, such as the master data server 105 of FIG. 1, after master data have been received from one of the client computer systems serviced by the master data server, such as one of the client computer systems 110a or 110b, and before the received master data are distributed to the client computer systems.

The process 400 begins when the master data server receives data from a client computer system (step 405). The client computer system may transfer the data to the master data server after the data are created on the client computer system by a user of the client computer system or by applications or processes operating on the client computer system. The master data server then identifies duplicates of the received data in a local store of master data, such as the master data 140 of FIG. 1 (step 410). As a result, stored master data that match the received data, or that are similar enough to the received master data to be called duplicative, may be identified.

A determination is made as to whether the identification is completely certain (step 415). The identification may be completely certain when the identification is made definitively within a maximum allowable amount of time, which may be, for example, one minute, one second, or one millisecond. If the master data server is unable to definitively determine whether duplicates of the received data appear on the master data server within the allowable amount of time, the master data server marks the received data for later testing (step 420). The later testing may perform more in-depth and time-intensive testing of the received data to identify locally stored duplicates of the received data. The later testing also may involve manual identification of duplicates in case the duplicates cannot be automatically identified. The later testing may include performance of the post-distribution cleansing service 155 or the manual cleansing service 160 of FIG. 1.

The master data server then treats the received data as if no duplicates were found so as to not inhibit the ability of the master data server to rapidly distribute the received data to other client computer systems that may be expecting the received master data. As such, the master data server stores the received data as master data in the local master data store (step 425) and also distributes the master data to the other client computer systems (step 430). The other client computer systems may then use the master data.

If the identification of duplicates of the received data is completely certain (step 415), then either definite duplicates of the received data have been identified, or it has been definitely determined that the master data server does not include duplicates of the received data (step 435). If no duplicates are stored on the master data server, then the received data are treated normally. More particularly, the master data server stores the received data as master data in the local master data store (step 440), and distributes the master data to the other client computer systems such that the other client computer systems may use the master data (step 445).

Otherwise, duplicates have been definitively found, and the duplicates are cleansed (step 450). The duplicates are cleansed in a manner similar to what is described with respect to step 215 of FIG. 2. In addition, the client computer system prevents redundant data from being stored on the master data server and distributed for use on the other client computer systems (step 455). Therefore, the duplicates have been cleansed before being proliferated to the other client computer systems.

Figure 5:
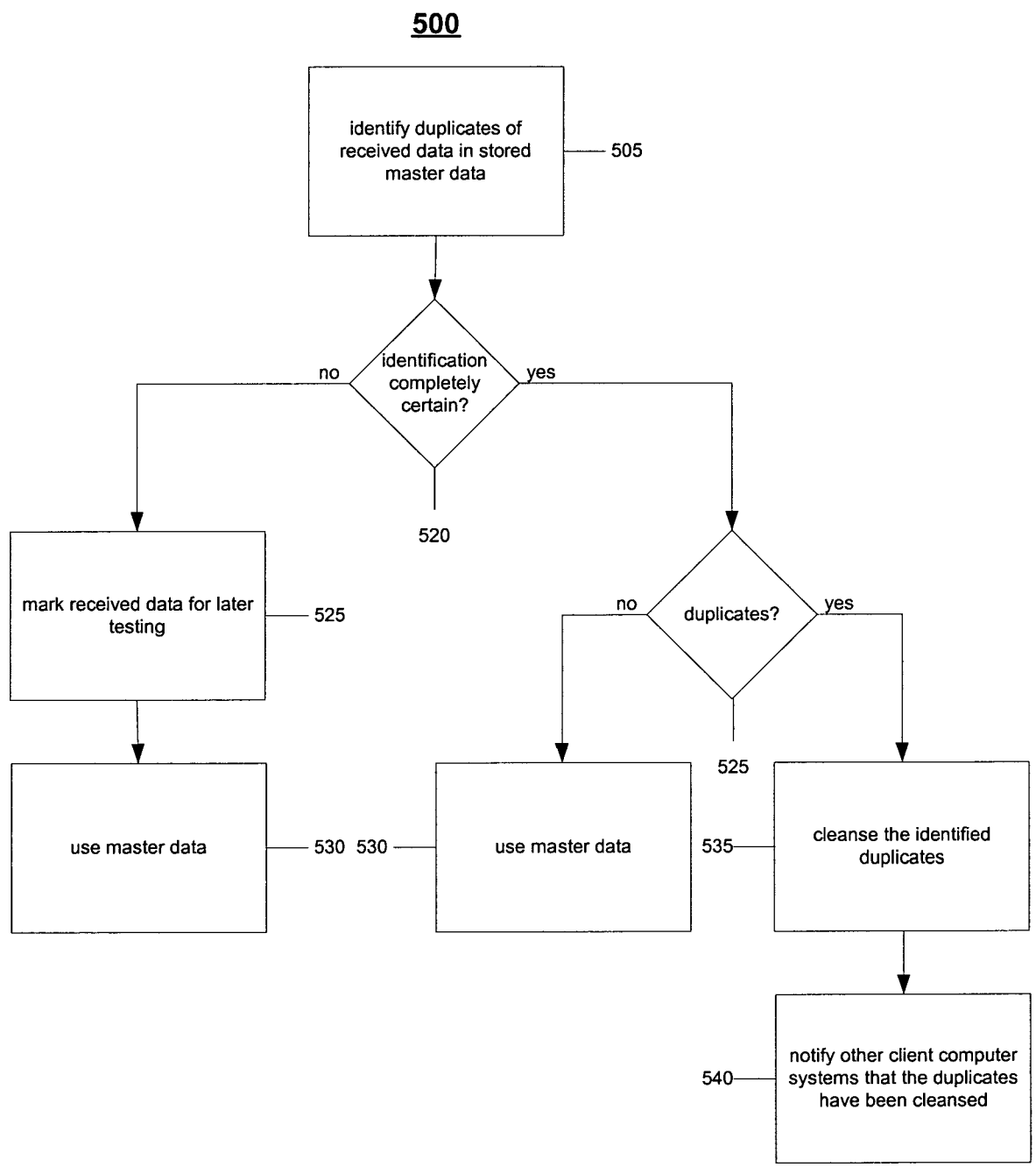
FIG. 5 is a flow chart of a process for reducing duplicative master data from a master data server after the duplicative master data are distributed.

FIG. 5 is a flow chart of a process for testing for and cleansing duplicative master data on a master data server that provides master data to multiple client computer systems that use the master data. The process 500 may be one implementation of the post-distribution cleansing process 155 of FIG. 1. The process 500 is executed by a master data server, such as the master data server 105 of FIG. 1, after master data that have been received from one of the client computer systems serviced by the master data server, such as one of the client computer systems 110*a* or 110*b,* are distributed to the client computer systems.

The process 500 begins when the master data server identifies duplicates of the data that have been received from one of the other client computer systems in a local store of master data, such as the master data 140 of FIG. 1 (step 510). As a result, stored master data that match the received data, or that are similar enough to the received master data to be called duplicative, may be identified. The data for which duplicates are identified may be data that have been marked by other processes, such as the process 400 of FIG. 4, that are unable to definitively identify duplicates of the data. The other processes may be unable to definitively identify duplicates of the data because the other processes may not have sufficient time to make the definitive identification. Alternatively or additionally, the data for which duplicates are identified may be data that have not yet been tested for duplicates due to time constraints that required the received data to be distributed before the received data were tested.

A determination is made as to whether the identification is completely certain (step 515). The identification may be completely certain when the identification is made definitively within a maximum allowable amount of time, which may be longer than the maximum time allowed for a definitive identification of duplicates prior to distribution of the master data. If the master data server is unable to definitively determine whether duplicates of the received data appear on the master data server, the master data server marks the received data for later testing (step 520). The later testing may perform more in-depth and time-intensive testing of the received data to identify locally stored duplicates of the received data. The later testing also may involve manual identification of duplicates in case the duplicates may not be automatically identified. The later testing may include performance of the manual cleansing service 160 of FIG. 1. To not interrupt or delay the operation of the master data server until the later testing may be performed, the master data server simply uses the stored master data normally (step 525). In other words, the master data server distributes the stored master data to the other client computer systems such that the other client computer systems may use the stored master data, and also updates the stored master data when the other client computer systems modify the master data that have been distributed.

If the identification of duplicates of the received data is completely certain (step 515), then either definite duplicates of the received data have been identified, or it has been definitely determined that the master data server does not include duplicates of the received data (step 530). If no duplicates are stored on the master data server, then the received data are used normally (step 535). Otherwise, duplicates have been definitively found, and the duplicates are cleansed (step 540). The duplicates are cleansed in a manner similar to what is described with respect to step 215 of FIG. 2. In addition, the other client computer systems to which the cleansed duplicates have been transferred may be notified that the duplicates have been cleansed such that the other client computer systems also may test for and cleanse the duplicates (step 545). Notifying the other client computer systems may include distributing the cleansed duplicates to the other client computer systems with an indication that the distributed duplicates should be cleansed locally by the other client computer systems. Therefore, the duplicates are cleansed from the master data server and the client computer systems to which the master data are transferred before being proliferated further.

Figure 6:
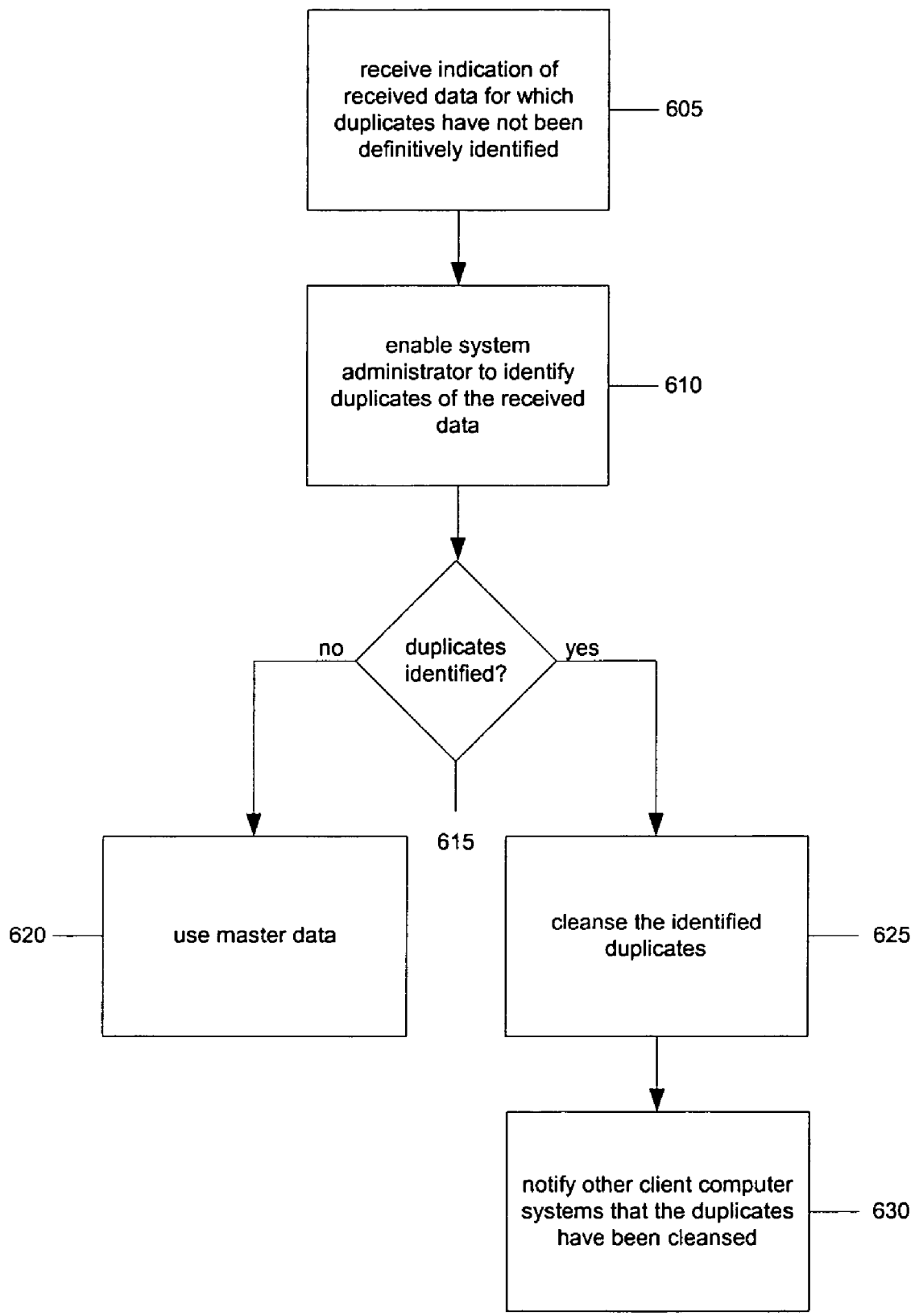
FIG. 6 is a flow chart of a process for manually reducing duplicative master data from a master data server.

FIG. 6 is a flow chart of a process 600 for enabling a system administrator of a master data server to manually identify duplicates of data that have been received by the master data server when the master data server is unable to quickly and with complete certainty identify the duplicates, in which case the master data server marks the received data as needing further processing. The process 600 may be one implementation of the manual cleansing service 160 of FIG. 1. The process 600 is executed by a master data server, such as the master data server 105 of FIG. 1, and involves interaction with a system administrator, or a data entry supervisor, of the master data server, such as the system administrator 180 of FIG. 1, that accesses the master data server through a client computer, such as the client computer 175 of FIG. 1. The process 600 may be executed by the master data server each time received data are marked, after a predetermined amount of received data has been marked, or periodically on a recurring basis. In all cases, the data tested in the process 600 have already been distributed for use on other client computer systems.

The process 600 begins when the master data server receives an indication of data received from a client computer system for which duplicates have not been definitively identified (step 605). Such an indication is generated when other processes, such as the processes 400 of FIG. 4 and 500 of FIG. 5, attempt to identify and cleanse duplicates of the received data but are unable to definitively do so. The indication may specify the received data for which duplicates are to be identified. The process 600 may continue each time such an indication is received or after a particular number of such indications have been received. Alternatively or additionally, the process 600 may continue periodically on a recurring basis that is specified by the system administrator.

Having received one or more indications of received data for which duplicates have not been definitively identified, the master data server enables the system administrator to identify duplicates of the received data in a local store of master data, such as the master data 140 of FIG. 1 (step 610). The master data server may do so by presenting an interface on the client computer used by the system administrator that displays the received data and master data that are stored on the master data server to enable comparison. The system administrator may use the interface to search through the stored master data to identify duplicates of the received master data. The interface may enable the user to perform complex calculations on the received data and the stored master data that may not have been possible before the received data were distributed to the other client computer systems due to time constraints. Based on the searching and the complex calculations, the system administrator may identify one or more duplicates of the received data, and the system administrator may use the interface to indicate that the duplicates have been found. For example, the system administrator may mark the duplicative master data that are stored on the master data server with the interface.

The master data server then determines whether the system administrator has identified any duplicates of the received data (step 615). Making such a determination may include determining whether the system administrator has used the interface to indicate that duplicates have been found. More particularly, the master data server may determine whether the system administrator has used the interface to mark any stored master data as duplicative. If not, then the master data server simply uses the stored master data normally (step 620). In other words, the master data server distributes the stored master data to the other client computer systems such that the other client computer systems may use the stored master data, and also updates the stored master data when the other client computer systems modify the master data that have been distributed.

If the master data server does determine that duplicates have been identified (step 615), then the master data server cleanses the identified duplicates (step 620). The master data server may identify the master data that the system administrator has identified as duplicative my searching for marks that have been applied to the stored master data to indicate that the marked master data are duplicative. Once identified, the duplicative master data are cleansed in a manner similar to what is described with respect to step 215 of FIG. 2. In addition, the other client computer systems to which the cleansed duplicates have been transferred may be notified that the duplicates have been cleansed such that the other client computer systems also may test for and cleanse the duplicates (step 630). Notifying the other client computer systems may include distributing the cleansed duplicates to the other client computer systems with an indication that the distributed duplicates should be cleansed locally by the other client computer systems. Therefore, the duplicates have been cleansed from the master data server and the client computer systems to which the master data are transferred before being proliferated further.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Figure 7:
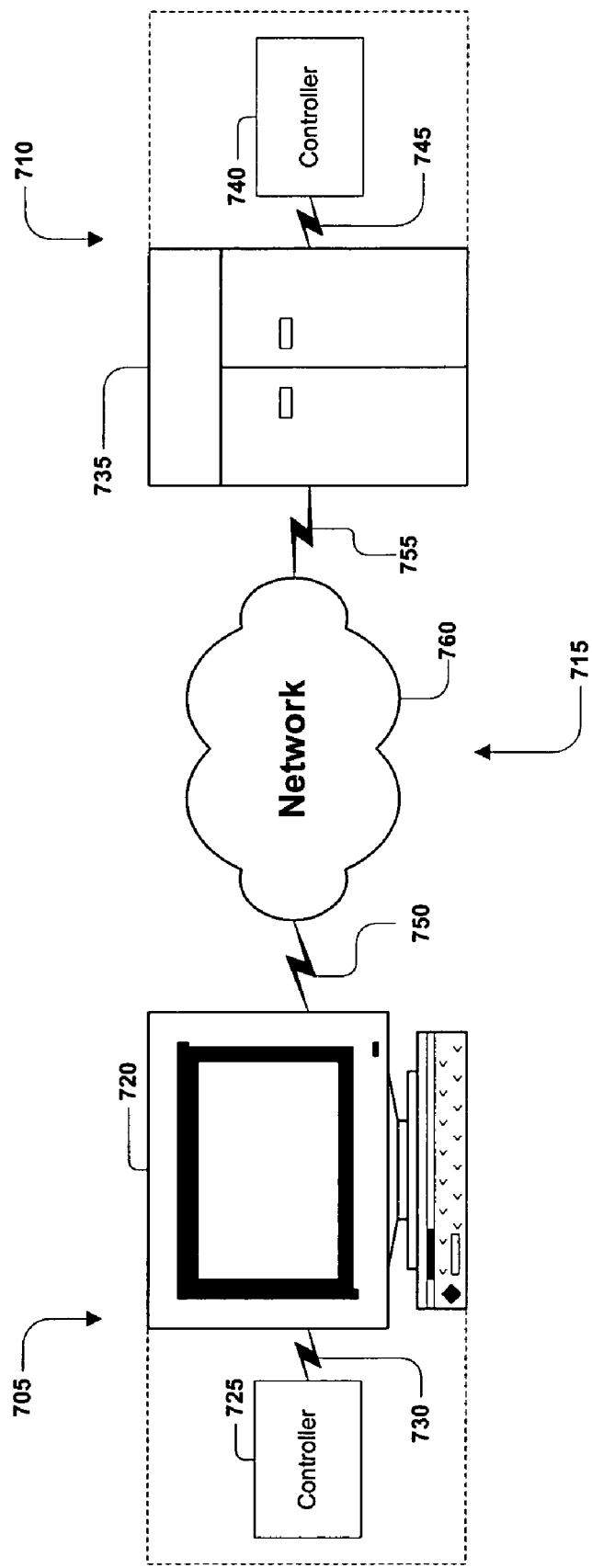
FIG. 7 is a block diagram of a communications system in which duplicative master data is reduced.
Figure 8:
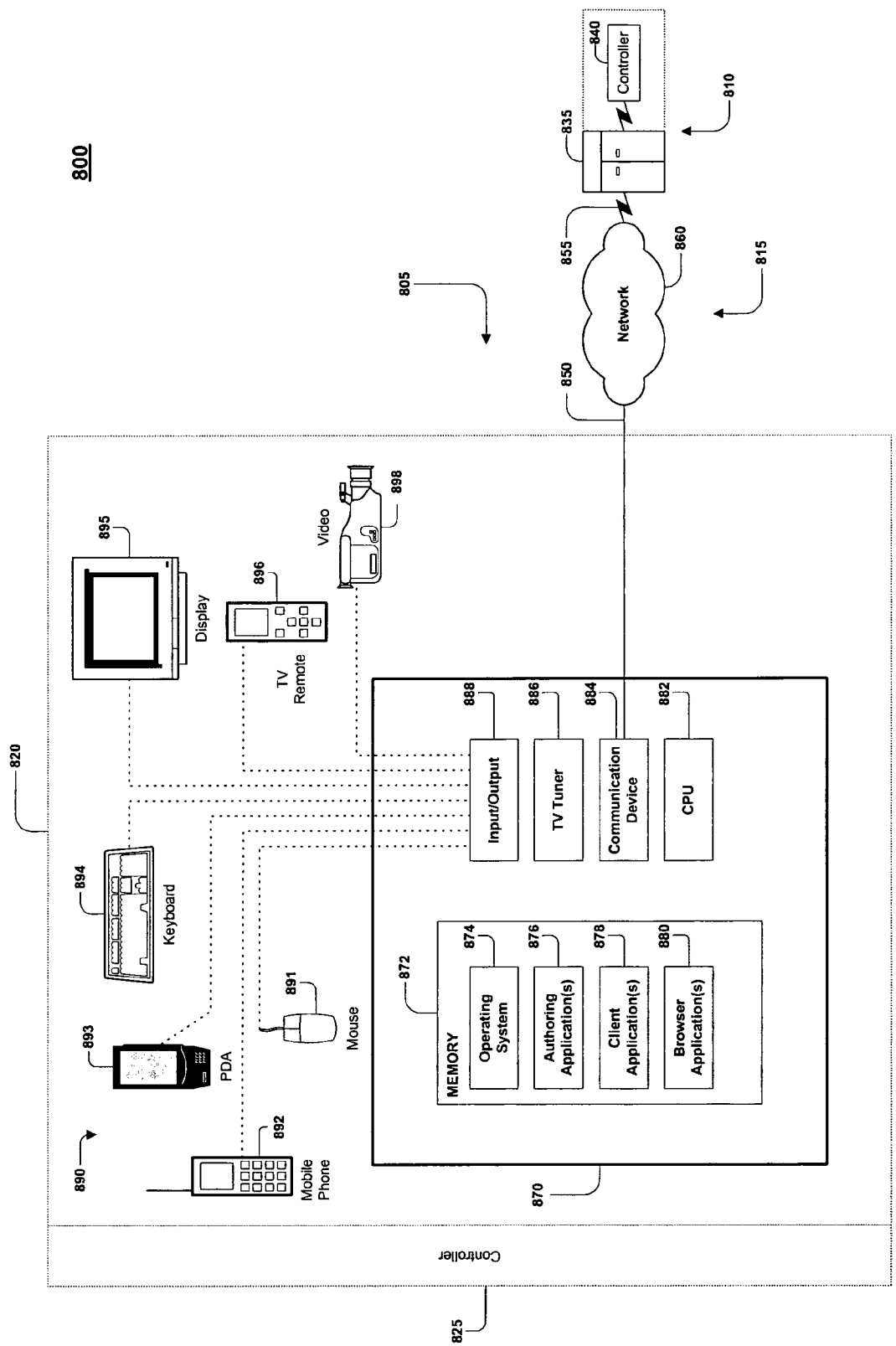
FIG. 8 is an expansion of the block diagram of FIG. 7.

For illustrative purposes, FIGS. 7 and 8 describe a communications system for implementing techniques for reducing duplicative master data in a master data server. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 7, a communications system 700 is capable of delivering and exchanging data between a client system 705 and a host system 710 through a communications link 715. The client 705 may be, for example, one of the client computer systems 110*a* and 110*b* of FIG. 1, and the host system 110 may be, for example, the master data server 105 of FIG. 1. The communications link 715 may be, for example, the network 115 of FIG. 1.

The client system 705 typically includes one or more client devices 720 and/or client controllers 725, and the host system 710 typically includes one or more host devices 735 and/or host controllers 740. For example, the client system 705 or the host system 710 may include one or more general-purpose computers (e.g., personal computers), one or more special-purpose computers (e.g., devices specifically programmed to communicate with each other and/or the client system 705 or the host system 710), or a combination of one or more general-purpose computers and one or more special-purpose computers. The client system 705 and the host system 710 may be arranged to operate within or in concert with one or more other systems, such as, for example, one or more LANs ("Local Area Networks") and/or one or more WANs ("Wide Area Networks").

The client device 720 (or the host device 735) is generally capable of executing instructions under the command of a client controller 725 (or a host controller 740). The client device 720 (or the host device 735) is connected to the client controller 725 (or the host controller 740) by a wired or wireless data pathway 730 or 745 capable of delivering data.

The client device 720, the client controller 725, the host device 735, and the host controller 740 each typically include one or more hardware components and/or software components. An example of a client device 720 or a host device 735 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 725 or a host controller 740 is a software application loaded on the client device 720 or the host device 735 for commanding and directing communications enabled by the client device 720 or the host device 735. Other examples include a program, a piece of code, an instruction, a device, a computer, a computer system, or a combination thereof, for independently or collectively instructing the client device 720 or the host device 735 to interact and operate as described. The client controller 725 and the host controller 740 may be embodied permanently or temporarily in any type of machine, component, physical or virtual equipment, storage medium, or propagated signal capable of providing instructions to the client device 720 or the host device 735.

The communications link 715 typically includes a delivery network 760 making a direct or indirect communication between the client system 705 and the host system 710, irrespective of physical separation. Examples of a delivery network 760 include the Internet, the World Wide Web, WANs, LANs, analog or digital wired and wireless telephone networks (e.g., PSTN, ISDN, and xDSL), radio, television, cable, satellite, and/ or any other delivery mechanism for carrying data. The communications link 715 may include communication pathways 750, 755 that enable communications through the one or more delivery networks 760 described above. Each of the communication pathways 750, 755 may include, for example, a wired, wireless, cable or satellite communication pathway.

FIG. 8 illustrates a communication system 800 including a client system 805 communicating with a host system 810 through a communications link 815. Client system 805 typically includes one or more client devices 820 and one or more client controllers 825 for controlling the client devices 820. Host system 810 typically includes one or more host devices 835 and one or more host controllers 840 for controlling the host devices 835. The communications link 815 may include communication pathways 850, 855 enabling communications through the one or more delivery networks 860.

Examples of each element within the communication system of FIG. 8 are broadly described above with respect to FIG. 7. In particular, the host system 810 and the communications link 815 typically have attributes comparable to those described with respect to the host system 710 and the communications link 715 of FIG. 7, respectively. Likewise, the client system 805 of FIG. 8 typically has attributes comparable to, and may illustrate one possible embodiment of, the client system 705 of FIG. 7.

The client device 820 typically includes a general purpose computer 870 having an internal or external storage 872 for storing data and programs such as an operating system 874 (e.g., DOS, Windows®, Windows® 95, Windows® 98, Windows® 2000, Windows® NT, Windows® Millennium Edition, Windows® XP, OS/8, Macintosh OS, and Linux) and one or more application programs. Examples of application programs include authoring applications 876 (e.g., word processing, database programs, spreadsheet programs, presentation programs, and graphics programs) capable of generating documents or other electronic content; client applications 878 capable of communicating with other computer users, accessing various computer resources, and viewing, creating, or otherwise manipulating electronic content; and browser applications 880 (e.g., Netscape's Navigator and Microsoft's Internet Explorer) capable of rendering standard Internet content.

The general-purpose computer 870 also includes a central processing unit 882 (CPU) for executing instructions in response to commands from the client controller 825. In one implementation, the client controller 825 includes one or more of the application programs installed on the internal or external storage 872 of the general-purpose computer 870. In another implementation, the client controller 825 includes application programs externally stored in and executed by one or more device(s) external to the general-purpose computer 870.

The general-purpose computer typically includes a communication device 884 for sending and receiving data. One example of the communication device 884 is a modem. Other examples include a transceiver, a set-top box, a communication card, a satellite dish, an antenna, or another network adapter capable of transmitting and receiving data over the communications link 815 through a wired or wireless data pathway 850. The general-purpose computer 870 also may include a TV ("television") tuner 886 for receiving television programming in the form of broadcast, satellite, and/or cable TV signals. As a result, the client device 820 can selectively and/or simultaneously display network content received by communications device 884 and television programming content received by the TV tuner 886.

The general-purpose computer 870 typically includes an input/output interface 888 to enable a wired or wireless connection to various peripheral devices 890. Examples of peripheral devices 890 include, but are not limited to, a mouse 891, a mobile phone 892, a personal digital assistant 893 (PDA), a keyboard 894, a display monitor 895 with or without a touch screen input, and/or a TV remote control 896 for receiving information from and rendering information to subscribers. Other examples may include voice recognition and synthesis devices.

Although FIG. 8 illustrates devices such as the mobile telephone 892, the PDA 893, and the TV remote control 896 as being peripheral with respect to the general-purpose computer 870, in another implementation, such devices may themselves include the functionality of the general-purpose computer 870 and operate as the client device 820. For example, the mobile phone 892 or the PDA 893 may include computing and networking capabilities, and may function as a client device 820 by accessing the delivery network 860 and communicating with the host system 810. Furthermore, the client system 805 may include one, some, all, or none of the components and devices described above.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for preventing proliferation of duplicative master data in a master data server, the method comprising:
   receiving data from a first client computer system at a master data server, the master data server including a data store for master data used by the first client computer system and a second client computer system;
   running preliminary tests to determine whether the data received from the first client computer system are duplicative of a portion of the master data stored in the data store;
   storing the received data in the data store as master data and distributing the received data to the second client computer system if the preliminary tests do not determine that the received data are duplicative of a portion of the master data stored in the data store; and
   running additional tests after distribution of the received data to the second client computer system to determine whether the data received from the first client computer system are duplicative of a portion of the master data stored in the data store.

2. The method of claim 1, further comprising cleansing the portion of the master data stored in the data store that is duplicative of the received data when the preliminary tests or the additional tests determine that the received data are duplicative of a portion of the master data stored in the data store.

3. The method of claim 2, wherein cleansing the portion of the master data stored in the data store that is duplicative of the received data comprises:
   deleting the portion of the master data stored in the data store that is duplicative of the received data; and
   storing the received data in the data store as master data.

4. The method of claim 2, wherein cleansing the portion of the master data stored in the data store that is duplicative of the received data comprises discarding the received data.

5. The method of claim 2, wherein cleansing the portion of the master data stored in the data store that is duplicative of the received data comprises setting attributes of the received data and the duplicative portion of the stored master data to a common value when the attributes do not have literally matching values between the received data and the duplicative portion of the stored master data.

6. The method of claim 2, wherein cleansing the portion of the master data stored in the data store that is duplicative of the received data comprises:
   storing the received data in the data store as master data; and
   causing the received data to refer to the duplicative portion.

7. The method of claim 1 wherein data received from the first client computer system are created or modified by the first client computer system, and further comprising:
   prior to receiving data from the first client computer system, storing master data on the first client computer system and running preliminary tests to determine whether the created or modified data is duplicative of a portion of the master data stored on the first client computer system; and
   transmitting to the master data server only the created portion or modified portion of the data that is not duplicative of the portion of the master data that is stored on the first client computer system.

8. The method of claim 1 wherein data distributed to the second client computer system are stored and used by the second client computer system, and further comprising:
   after distributing the received data to the second client computer system, storing the received data as master data on the second client computer system and running additional tests to determine whether the received data is duplicative of a portion of the master data stored on the second client computer system; and
   using only the portion of the received data that is not duplicative of the portion of the master data that is stored on the second client computer system.

9. The method of claim 1, wherein:
   running preliminary tests to determine whether the data received from the first client computer system are duplicative of a portion of the master data stored in the data store comprises running the preliminary tests to definitively determine whether the received data are duplicative of a portion of the stored master data within a maximum allowable amount of time;
   storing the received data in the data store comprises storing the received data in the data store when the preliminary tests do not definitively determine that the received data are duplicative of a portion of the stored master data within the maximum allowable amount of time; and
   distributing the received data to the second client computer system comprises distributing the received data to the second client computer system when the preliminary tests do not definitively determine that the received data are duplicative of a portion of the stored master data within the maximum allowable amount of time.

10. The method of claim 9, further comprising cleansing the portion of the stored master data that are duplicative of the received data when the preliminary tests definitively determine that the received data are duplicative of a portion of the stored master data within the maximum allowable amount of time.

11. The method of claim 9, further comprising indicating that a later determination of whether the received data are duplicative of a portion of the master data stored in the data store is necessary when the preliminary tests do not definitively determine that the received data are duplicative of a portion of the stored master data within the maximum allowable amount of time.

12. The method of claim 11, further comprising enabling a user to manually indicate whether the received data are duplicative of a portion of the stored master data when an indication that a later determination of whether the received data are duplicative of a portion of the stored master data is necessary is received.

13. The method of claim 12, wherein enabling a user to manually indicate whether the received data are duplicative of a portion of the stored master data comprises:

enabling a user to identify a portion of the master data stored in the data store that is duplicative of the received data; and cleansing the portion of the master data in the data store that is duplicative of the received data.

14. The method of claim 1 wherein running the additional tests comprises accessing an external service to verify a determination of whether the data received from the first client computer system is duplicative of a portion of the master data stored in the data store.

15. The method of claim 14 wherein the external service is a web-based service.

16. A computer readable storage medium having embodied thereon instructions executable by one or more processors to perform a method to distribute data, the method comprising:

receiving data from a first client computer system at a master data server, the master data server including a data store for master data used by the first client computer system and a second client computer system;

running preliminary tests to determine whether the data received from the first client computer system are duplicative of a portion of the master data stored in the data store;

storing the received data in the data store as master data and distributing the received data to the second client computer system if the preliminary tests do not determine that the received data are duplicative of a portion of the master data stored in the data store; and running additional tests after distribution of the received data to the second client computer system to determine whether the data received from the first client computer system are duplicative of a portion of the master data stored in the data store.

17. The computer readable storage medium of claim 16, wherein the method further comprises cleansing the portion of the master data stored in the data store that is duplicative of the received data when the preliminary tests or the additional tests determine that the received data are duplicative of a portion of the master data stored in the data store.

18. The computer readable storage medium of claim 16 wherein data received from the first client computer system are created or modified by the first client computer system, and further comprising:

prior to receiving data from the first client computer system, storing master data on the first client computer system and running preliminary tests to determine whether the created or modified data is duplicative of a portion of the master data stored on the first client computer system; and transmitting to the master data server only the created portion or modified portion of the data that is not duplicative of the portion of the master data that is stored on the first client computer system.

19. The computer readable storage medium of claim 16 wherein data distributed to the second client computer system are stored and used by the second client computer system, and further comprising:

after distributing the received data to the second client computer system, storing the received data as master data on the second client computer system and running additional tests to determine whether the received data is duplicative of a portion of the master data stored on the second client computer system; and using only the portion of the received data that is not duplicative of the portion of the master data that is stored on the second client computer system.

20. The computer readable storage medium of claim 16, wherein:

running preliminary tests to determine whether the data received from the first client computer system are duplicative of a portion of the master data stored in the data store comprises running the preliminary tests to definitively determine whether the received data are duplicative of a portion of the stored master data within a maximum allowable amount of time;

storing the received data in the data store comprises storing the received data in the data store when the preliminary tests do not definitively determine that the received data are duplicative of a portion of the stored master data within the maximum allowable amount of time; and distributing the received data to the second client computer system comprises distributing the received data to the second client computer system when the preliminary tests do not definitively determine that the received data are duplicative of a portion of the stored master data within the maximum allowable amount of time.

21. The computer readable storage medium of claim 20, further comprising cleansing the portion of the stored master data that are duplicative of the received data when the preliminary tests definitively determine that the received data are duplicative of a portion of the stored master data within the maximum allowable amount of time.

22. The computer readable storage medium of claim 20, further comprising indicating that a later determination of whether the received data are duplicative of a portion of the master data stored in the data store is necessary when the preliminary tests do not definitively determine that the received data are duplicative of a portion of the stored master data within the maximum allowable amount of time.

23. The computer readable storage medium of claim 22, further comprising enabling a user to manually indicate whether the received data are duplicative of a portion of the stored master data when an indication that a later determination of whether the received data are duplicative of a portion of the stored master data is necessary is received.

24. The computer readable storage medium of claim 23, wherein enabling a user to manually indicate whether the received data are duplicative of a portion of the stored master data comprises:

enabling a user to identify a portion of the master data stored in the data store that is duplicative of the received data; and cleansing the portion of the master data in the data store that is duplicative of the received data.

25. The computer readable storage medium of claim 16 wherein running the additional tests comprises accessing an external service to verify a determination of whether the data received from the first client computer system is duplicative of a portion of the master data stored in the data store.

26. A system for maintaining consistency among master data that are used by multiple client computer systems, the system comprising:

a first client computer system, the first client computer system being operable to 1) create or modify data while performing a business function for a business enterprise that operates the first client computer system, 2) store master data used by the first client computer system, and 3) transmit the created or modified data; and a master data server, the master data server being operable to 1) receive data transmitted by the first client computer system, 2) store the received data as master data in a local data store, 3) distribute the master data stored in the data store to other client computer systems that may use the transmitted master data, 4) run preliminary tests to determine whether the received data are duplicative of a portion of the master data stored in the data store before the master data are distributed, 5) run additional tests to determine whether the received data are duplicative of a portion of the master data stored in the data store after the master data are distributed.

27. The system of claim 26, wherein the first client computer system is operable to 1) determine whether the created or modified data are duplicative of a portion of the master data stored by the first client computer system, 2) store the created or modified data as master data when the created or modified data are not duplicative of a portion of the stored master data, and 3) transmit the created or modified data when the created or modified data are not duplicative of a portion of the stored master data.

28. The system of claim 26, further comprising a second client computer system, the second client computer system being operable to 1) receive master data from the master data server, 2) store master data used by the second client computer system, 3) determine whether the received master data are duplicative of a portion of the stored master data, 4) store only the received master data that are not duplicative of a portion of the stored master data, and 5) use only the received master data that are not duplicative of a portion of the stored master data while performing a business function for the business enterprise.

29. The system of claim 26, wherein the master data server is operable to enable a user of the master data server to determine whether the received data are duplicative of a portion of the master data stored in the data store such that the master data server may cleanse the portion of the stored master data that is duplicative of the received data.

* * * * *

UNITED STATES PATENT AND TRADEMARK OFFICE
CERTIFICATE OF CORRECTION

PATENT NO. : 7,587,423 B2  Page 1 of 1
APPLICATION NO. : 10/943138
DATED : September 8, 2009
INVENTOR(S) : Kalthoff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1389 days.

Signed and Sealed this

Twenty-first Day of September, 2010

David J. Kappos
*Director of the United States Patent and Trademark Office*